(12) United States Patent  
Trzecieski

(10) Patent No.: US 8,459,825 B2  
(45) Date of Patent: Jun. 11, 2013

(54) AESTHETIC DEVICE FOR PROVIDING OF ELECTRICAL POWER TO EXTERNAL ELECTRONIC DEVICES

(76) Inventor: Michael Trzecieski, Hong Kong (HK)

( * ) Notice: Subject to any disclaimer, the term of this patent is extended or adjusted under 35 U.S.C. 154(b) by 310 days.

(21) Appl. No.: 12/793,684

(22) Filed: Jun. 4, 2010

(65) Prior Publication Data

US 2010/0308725 A1    Dec. 9, 2010

Related U.S. Application Data

(60) Provisional application No. 61/183,995, filed on Jun. 4, 2009.

(51) Int. Cl.
*F21L 4/08* (2006.01)
*F21V 21/08* (2006.01)

(52) U.S. Cl.
USPC ............................ 362/157; 362/103; 362/108

(58) Field of Classification Search
USPC ............................ 362/103, 104, 108, 157, 183
See application file for complete search history.

(56) References Cited

U.S. PATENT DOCUMENTS

| 2,641,333 | A | * | 6/1953 | Woessner | 55/368 |
| 3,910,257 | A | * | 10/1975 | Fletcher et al. | 600/483 |
| 6,056,412 | A | * | 5/2000 | Atlee et al. | 362/103 |

* cited by examiner

*Primary Examiner* — David V Bruce

(57) ABSTRACT

A novel aesthetic device is disclosed for providing of electrical power to external electronic devices. The aesthetic device is formed from an elongated band having a first end and a second end at opposites ends thereof and an engagement mechanism disposed proximate the second end of the elongated band for engaging of the elongated band proximate the first end. A plurality of rechargeable battery cells embedded within the elongated band for at least one of providing of electrical energy therefrom and for storing of electrical energy therein. A control circuit coupled with the plurality of rechargeable battery cells and a device connector coupled with the control circuit and the plurality of rechargeable battery cells for at least one of providing of electrical energy to an external electronic device for powering thereof and for receiving of electrical from an external electronic device for recharging of the plurality of rechargeable battery cells.

20 Claims, 3 Drawing Sheets

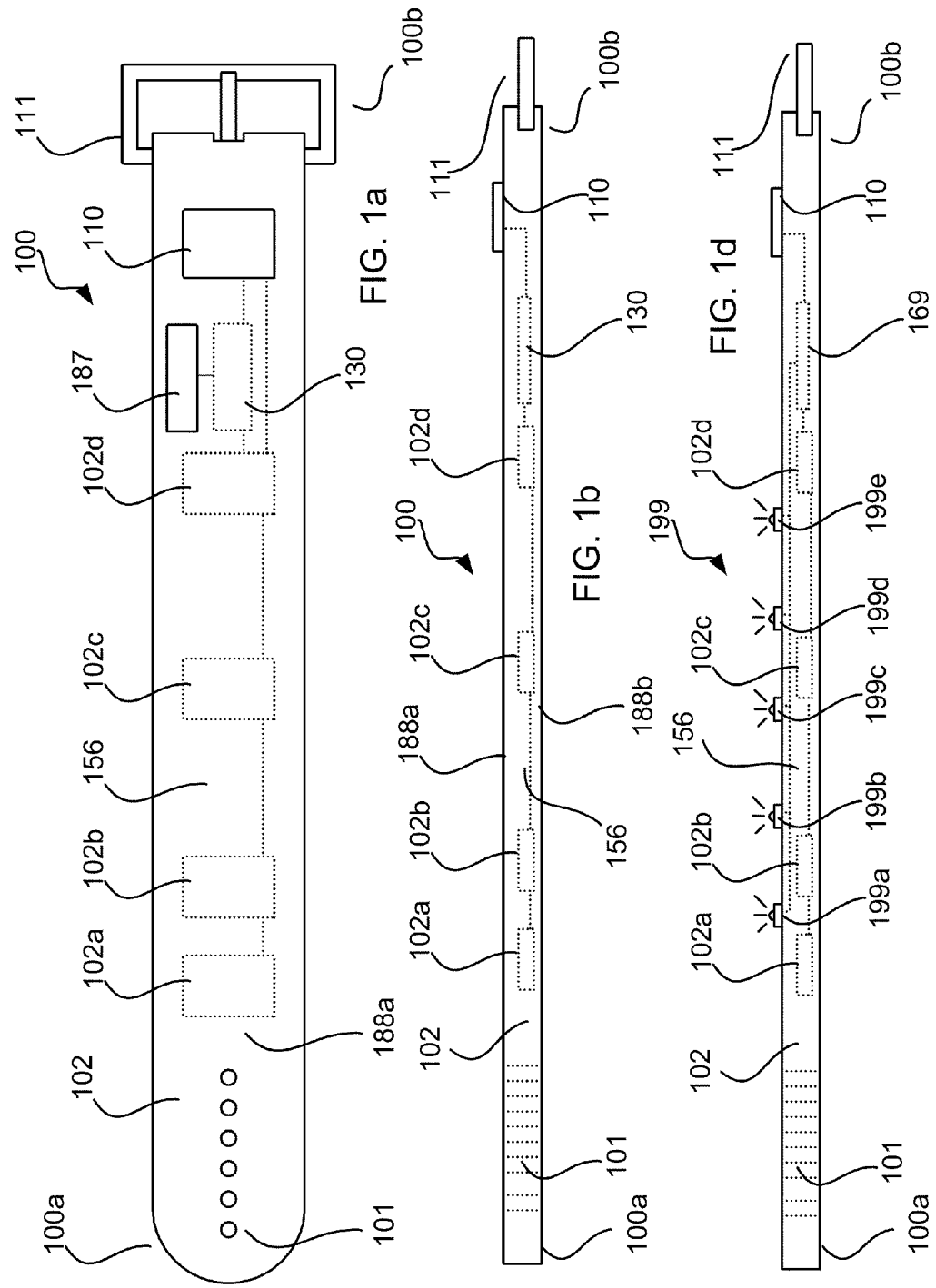

AESTHETIC DEVICE FOR PROVIDING OF ELECTRICAL POWER TO EXTERNAL ELECTRONIC DEVICES

This application claims priority from U.S. Provisional Application No: 61/183,995 Filed on Jun. 4, 2009.

FIELD OF THE INVENTION

This invention relates generally to a device containing rechargeable batteries and more specifically to aesthetic device for containing rechargeable batteries for use with external electronic devices.

BACKGROUND OF THE INVENTION

More and more people are carrying external electrical devices on their person, such as portable music players, digital cameras and cellular telephones. Many of these devices are rechargeable through USB and periodically require electrical charging in order to provide their desired function. In quite a few instances, recharging of the external electrical device is not possible because of a lack of a power source. Various electrical power transfer technologies are known, such as direct coupling using wires or through the use of wireless power transfer.

Furthermore, electrically powered apparel is also becoming something of a phenomenon in the garment industry, where illumination, or other electrical devices, is disposed within garments. Unfortunately, these devices require electrical power and in some cases providing a battery pack with the garment is not advantageous because it potentially restricts the aesthetics of the garment or the weight of the garment. In addition, in some cases, the provision of a battery pack within the garment is not possible because when cleaning of the garment, the battery pack may get damaged.

It is therefore an object of the invention to provide an aesthetically appealing charge storage device that overcomes the aforementioned deficiencies.

SUMMARY OF THE INVENTION

In accordance with the invention there is provided an aesthetic device comprising: an elongated band comprising a first end and a second end at opposites ends thereof and an outer surface and an inner surface disposed therebetween; an engagement mechanism disposed proximate the second end of the elongated band for engaging of the elongated band proximate the first end thereof; a plurality of rechargeable battery cells embedded within the elongated band for at least one of providing of electrical energy therefrom and for storing of electrical energy therein; a control circuit coupled with the plurality of rechargeable battery cells; a device connector coupled with the control circuit and the plurality of rechargeable battery cells for at least one of providing of electrical energy thereto and for receiving of electrical energy therefrom.

In accordance with the invention there is provided an aesthetic device comprising: an elongated band comprising a first end and a second end at opposites ends thereof and an outer surface and an inner surface disposed therebetween; an engagement mechanism disposed proximate the second end of the elongated band for engaging of the elongated band proximate the first end; a first rechargeable battery cell embedded within the elongated band; a second rechargeable battery cell embedded within the elongated band; a gap formed between the first rechargeable battery cell and the second rechargeable battery cell and disposed between the inner surface and the outer surface; a control circuit coupled with the first rechargeable battery cell and the second rechargeable battery cell; a device connector for coupling with one of a first external electronic device and a second external electronic device, where in a first mode of operation the first external electronic device is for providing of electrical energy to the control circuit for charging of the first and second rechargeable battery cells and in a second mode of operation the second external electronic device is for receiving of electrical energy from the control circuit coupled with the first and second rechargeable battery cells and for providing the electrical energy to the second external electronic device, wherein the gap formed between the between the first rechargeable battery cell and the second rechargeable battery cell facilitates bending of the elongated band for the engagement mechanism to facilitate engaging the elongated band proximate the first end.

In accordance with the invention there is provided a method comprising: providing a plurality of rechargeable battery cells embedded within a flexible elongated band comprising a first end disposed opposite a second end; providing a control circuit coupled with the plurality of rechargeable battery cells; providing a device connector coupled with the control circuit for accepting a connection from one of a first external electronic device and a second external electronic device; in a first mode of operation, coupling of the first external electronic device to the device connector and charging the plurality of rechargeable battery cells the with electrical energy received from the first external electronic device; and, in a second mode of operation, coupling of the second external electronic device to the device connector and providing of electrical energy stored within the plurality of rechargeable battery cells to the second external electronic device, wherein the control circuit determines whether to receive electrical energy from the first external electronic device and whether to provide electrical energy to the second external electronic device.

BRIEF DESCRIPTION OF THE DRAWINGS

Exemplary embodiments of the invention will now be described in conjunction with the following drawings, in which:

FIG. 1a illustrates a top view of the preferred embodiment of the invention;

FIG. 1b illustrates a side view of the preferred embodiment of the invention;

FIG. 1d illustrates a side view of a variation of the preferred embodiment of the invention;

DESCRIPTION OF EMBODIMENTS OF THE INVENTION

Figure 2A:
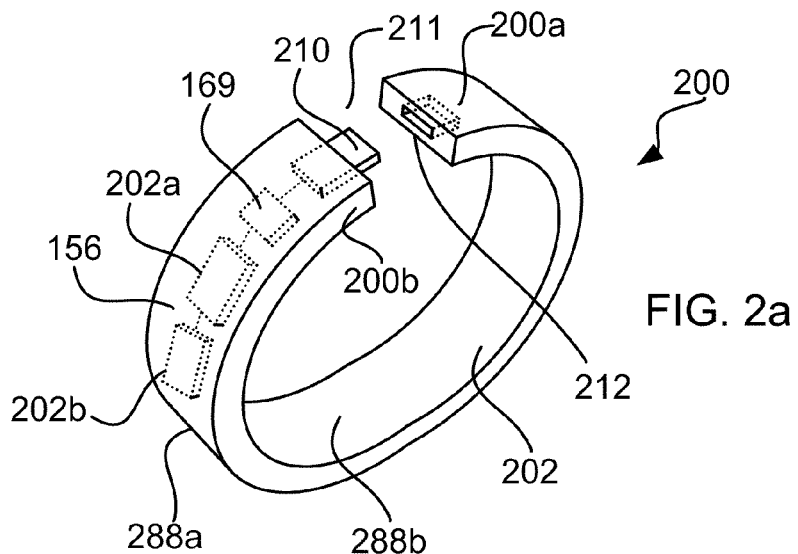
FIG. 2a illustrates a perspective view of a variation of the preferred embodiment of the invention.

FIG. 1a illustrates an aesthetic device 100 in accordance with the preferred embodiment of the invention and FIG. 1b illustrates the aesthetic device 100 from a side view. The aesthetic device 100 is formed an elongated band 102 comprising a first end 100a and a second end 100b at opposite ends thereof and having an outer surface 188a and an inner surface 188b disposed therebetween.

An engagement mechanism 111 is disposed proximate the second end 100b of the elongated band 102 for engaging the elongated band 102 proximate the first end 100a thereof. A plurality of battery cells 102a, 102b, 102c, 102d, preferably in the form of lithium type battery cells, are preferably embedded within the band 102 between the outer and inner surfaces, 188a and 188b, and electrically coupled to one another for at least one of providing of electrical energy therefrom and for storing of electrical energy therein. Preferably the plurality of battery cells 102a, 102b, 102c, 102d are embedded within the elongated band 102 in a waterproof manner so that when the aesthetic device 100 is dipped into water the plurality of rechargeable battery cells 102a, 102b, 102c, 102d and the control circuit 130 do not contact the water.

From the plurality rechargeable battery cells 102a, 102b, 102c, 102d, there is a first rechargeable battery cell 102b and a second rechargeable battery cell 102c and wherein the elongated band 102 comprises a gap 156 formed between the first and second rechargeable battery cells 102b and 102c where the gap 156 allows for bending of the elongated band 102 at a position along its length between the first and second rechargeable battery cells 102b and 102c for bringing the first and second ends of the elongated band closer together, 100a and 100b, respectively, such as is illustrated in FIG. 1a. For facilitating the bending of the elongated band 102, preferably the elongated band 102 is formed from a flexible material, such as thermoplastic urethane, which is used to over mold the plurality rechargeable battery cells 102a, 102b, 102c, 102d and the control circuit 130. The over molding process facilitates the plurality of rechargeable battery cells 102a, 102b, 102c, 102d and the control circuit 130 to be disposed within the elongated band 102 in a waterproof manner.

A device connector 110 is coupled with the plurality of rechargeable battery cells 102a, 102b, 102c, 102d for at least one of providing of electrical energy thereto and for receiving of electrical energy therefrom. A control circuit 130 (as is shown in more detail in FIG. 1c) is disposed within the band 102 and electrically coupled with the plurality of rechargeable battery cells 102a, 102b, 102c, 102d and electrically coupled to the device connector 110. Preferably the plurality rechargeable battery cells 102a, 102b, 102c, 102d are formed from a lithium type material.

Referring to FIGS. 1a and 1b, optionally, at least an aperture 101 is formed within the elongated band 102 proximate the first end 100a for engaging of the engagement mechanism 111 proximate the second end 100b. For example, the aesthetic device 100 is formed into the shape of a belt that is worn around an object, such as around a mid section of a person where the inner surface 100b thereof is for facing the person.

The elongated band 102 has a length defined between the first and second ends thereof, 100a and 100b and a width defined approximately perpendicular to the first and second ends thereof, 100a and 100b, where the length is larger than the width. A thickness of the band is defined as a distance between the inner and outer surfaces, 188b and 188a.

Figure 1C:
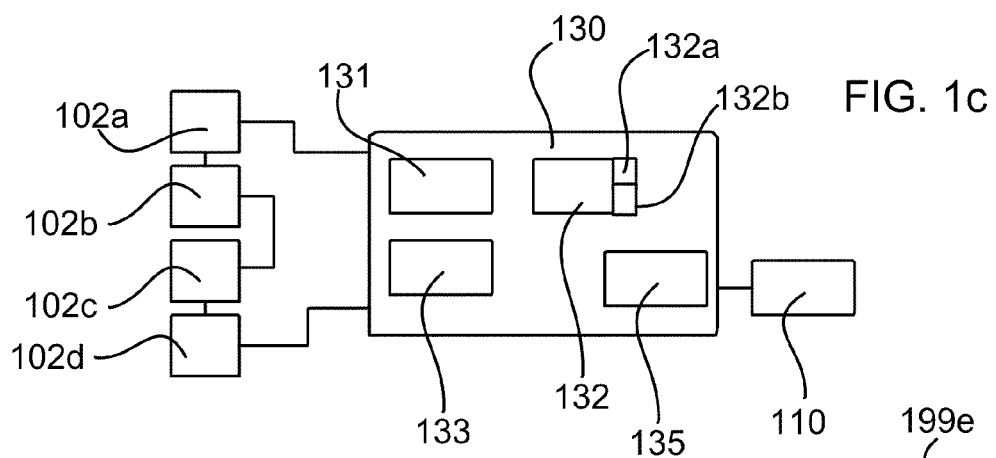
FIG. 1c illustrates a control circuit as part of the preferred embodiment of the invention.
Figure 1E:
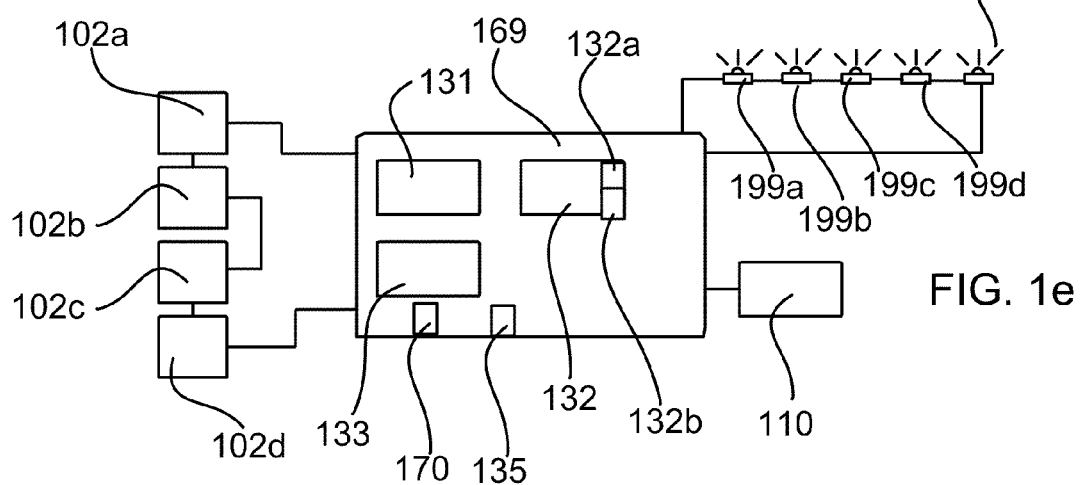
FIG. 1e illustrates a control circuit as part of the variation of the preferred embodiment of the invention.

FIG. 1c illustrates the control circuit 130 in further detail. The control circuit 130 comprises a recharging circuit 132 coupled with the device connector 110 and the plurality of rechargeable battery cells 102a through 102d for facilitating recharging thereof by using the device connector 110. In addition, the control circuit 130 comprises a voltage regulator circuit 131 coupled with the device connector 110 and the plurality of rechargeable battery cells 102a through 102d for regulating at least one of a voltage and a current that is provided from the plurality of rechargeable battery cells 102a, 102b, 102c, 102d to the device connector 110. Preferably the device connector 110 is for providing of a voltage between 4.8V and 36V and is preferably adjustable.

Optionally, the control circuit 130 also comprises one of a non volatile memory circuit 133 and a non volatile memory receptacle 135 for receiving a removable non volatile memory circuit for use in storing of digital data.

Figure 2B:
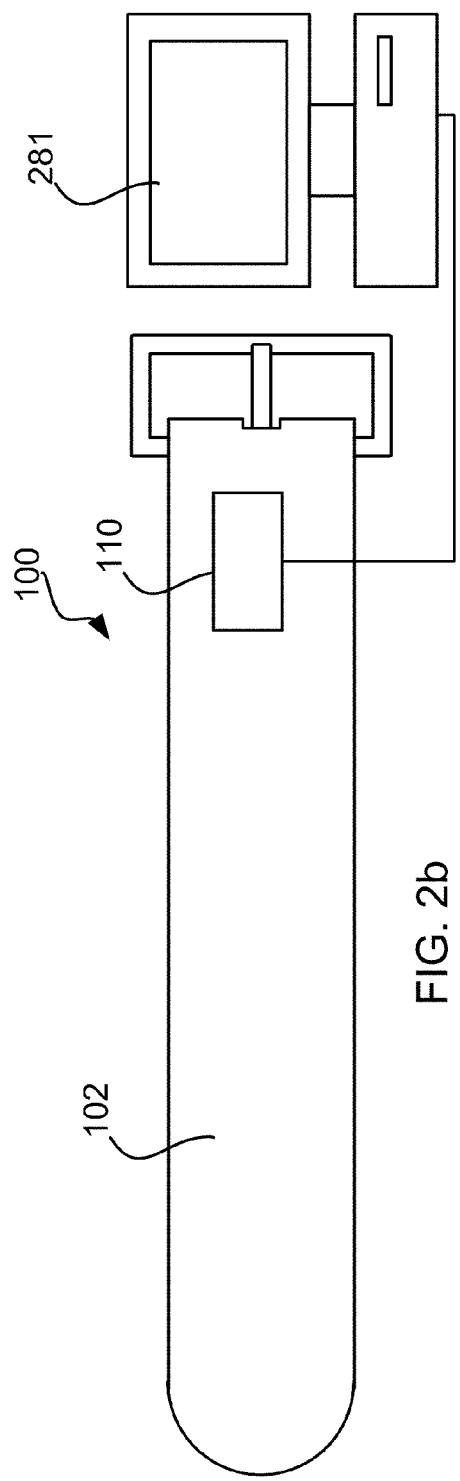
FIG. 2b illustrates the preferred embodiment of the invention coupled to operate in a first mode of operation; and, FIG. 2c illustrates the preferred embodiment of the invention coupled to operate in a second mode of operation.

Referring to FIG. 2b, in a first mode of operation of the aesthetic device 100, in order to facilitate recharging the plurality of batteries 102a through 102d, the device connector 110 is coupled with a first external electronic device 281, which is preferably in the form of a USB connector, and charging of the plurality of rechargeable battery cells 102a through 102d occurs using electrical energy from the first external electronic device 281. For example, the first external electronic device 281 is in the form of a personal computer having a USB port. The recharging circuit 132 comprises at least one of a voltage boosting circuit 132a and a voltage regulating 132b circuit in order to facilitate recharging of the plurality of batteries 102a through 102d. For example, in the case when the device connector 110 is plugged into the USB port, the USB port provide approximately 5W of power at approximately 5V and 1 A, however to charge the plurality of batteries 102a through 102d a higher voltage may be necessary, as such, the voltage boosting circuit 132a is utilized to increase a charging voltage within the control circuit 130 to be higher than 5V. Optionally, a solar panel 187 is disposed on an outer surface 188a of the aesthetic band and coupled with the control circuit 130 to facilitate recharging of the plurality of batteries 102a through 102d.

Figure 2C:
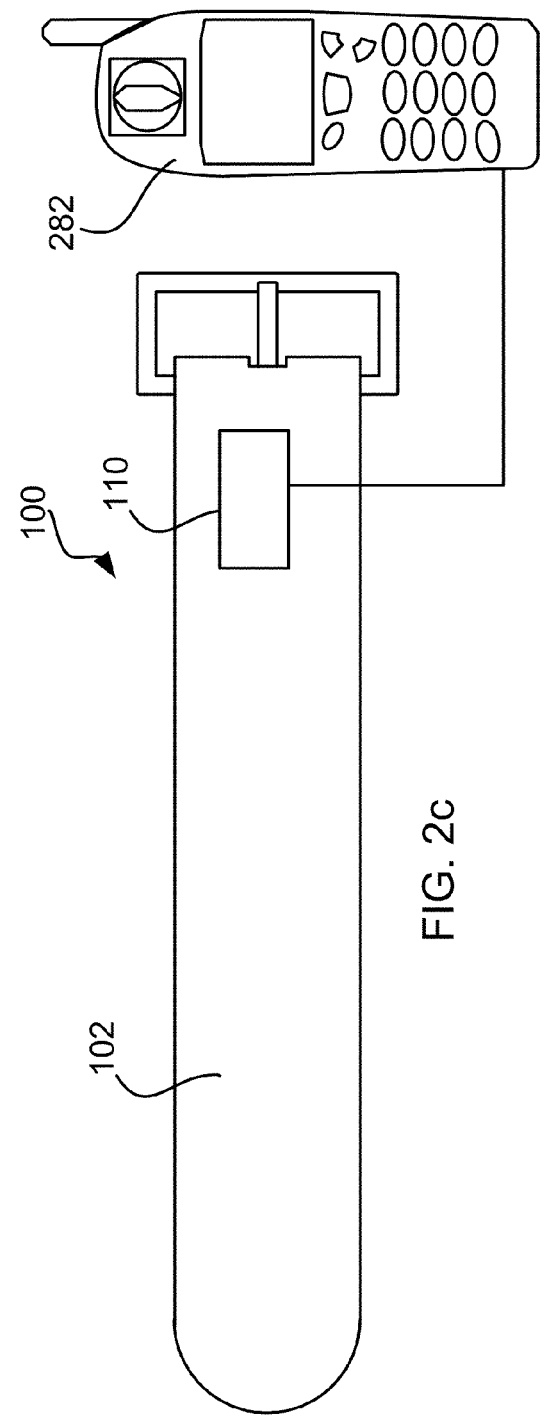

Referring to FIG. 2c, in a second mode of operation of the aesthetic device 100, in order to facilitate being able to provide electrical power from the plurality of batteries 102a through 102d through the device connector 110, the device connector 110 is coupled with a second external electronic device 282, such as a USB port of a mobile phone and the voltage regulator circuit 131 has its current and voltage adjusted to provide approximately 1 A and 5V of electrical power to the second external electronic device. In such a manner, when the second external electronic device 282 is coupled with the device connector 110 using a USB connection, recharging of the second external electronic device 282 is facilitated as if the second external electronic device 282 were connected to a USB port of a computer. The control circuit 130 determines whether to receive electrical power from the first external electronic device 281 or whether to provide electrical power to the second external electronic device 282.

FIG. 1d illustrates a variation of the preferred embodiment of the invention, where an aesthetic device 199 is provided having a control circuit 169 and a plurality of LEDs (light emitting diodes) 199a through to 199d, are coupled therewith and disposed about an outer surface 188a of the elongated band 102. The plurality of light emitting diodes 199a through to 199d are coupled with the control circuit 169 and preferably the plurality of light emitting diodes 199a through to 199d are in the form of tri colored light emitting diodes so they controllably emit red, green and blue or combinations thereof. The control circuit 169 is utilized for controlling each of the LEDs in order to be able to set a color and intensity of each diode individually. Preferably, at least a light emitting diode 199b, from the plurality of light emitting diodes 199a through 199e, is disposed proximate the gap 156 formed between the first and second rechargeable battery cells, 102b and 102c.

The control circuit 169 includes a memory circuit 170 therein for containing date representative of various combinations of control parameters for controlling each of the plurality of light emitting diodes 199a through to 199d with respect to color and intensity.

Preferably for this embodiment the device connector 110 is in the form of a USB connector that facilitates connection to a personal computer in order to allow programming of various colors and light changing patterns for the plurality of light emitting diodes 199a through to 199d. In use, the aesthetic device 199 is coupled to a USB port of a personal computer and through the USB port of the personal computer the pluralities of batteries 102a through 102d are recharged and in addition date representative of various combinations of control parameters for controlling each of the plurality of light emitting diodes 199a through to 199d is adjusted using the personal computer, such as is shown in FIG. 2b, and then is stored within the memory circuit 170, such that upon removal of the device connector 110 from the personal computer, the plurality of light emitting diodes 199a through to 199d have their colors and intensities adjusted in accordance with the date representative of various combinations of control parameters.

FIG. 2a illustrates an aesthetic device 200 as a variation of the preferred embodiment of the invention. In this case the aesthetic band 200 is formed from an elongated band 202 comprising a first end 200a and a second end 200b at opposite ends thereof and having an outer surface 288a and an inner surface 288b disposed therebetween.

An engagement mechanism 211 is disposed proximate the second end 200b of the elongated band 202 for engaging the elongated band 202 proximate the first end 200a thereof. At least a rechargeable battery cell 202a and 202b, preferably in the form of a lithium type battery cell, is preferably embedded within the band 202 between the inner and outer surfaces, 288a and 288b, and electrically coupled with a control circuit 169. Preferably the at least a battery cell 202a and 202b is embedded within the elongated band 202 in a waterproof manner. A device connector 210 is coupled with one the control circuit 169, which is also coupled with the at least a battery cell 202a. The device connector 210 is preferably in the form of a USB connector and it forms part of the engagement mechanism 211 where the engagement mechanism is formed about the device connector 210 and the engagement between the first end 200a and the second end 200b of the elongated band 202 provides engagement in a waterproof manner for the device connector 210 within an aperture 212 formed proximate the first end 200a. The gap 156 formed between the at least a rechargeable battery cell 202a and 202b facilitates bending of the elongated band 202.

Advantageously, in accordance with the embodiments of the invention, rechargeable lithium type batteries are preferably utilized, such as lithium polymer, because they are thin, flexible, light and are able to store large amounts of energy. Additionally, rechargeable lithium type batteries, such as lithium polymer batteries are also flat in nature, as such, they facilitate being disposed within an elongated band. The gaps, referring to FIG. 1a where the gap 156 is illustrated, formed between the lithium polymer batteries thus allow the band to bend between the batteries and to remain flexible. Optionally, other battery chemistry technologies are also envisages, such as NiMh, lead acid or other. These batteries embedded within the elongated band in such a manner that they are protected from water damage in the case the band is immersed in water.

Advantageously, the preferred embodiment of the invention facilitates recharging or powering of external USB type devices. For example, if the user has a music player or telephone that has run out of power, plugging in the telephone or the music player into the device connector of the aesthetic device facilitates charging of the music player or telephone through the USB port. Further advantageously, the preferred embodiment of the invention facilitates charging or powering of external electronic devices that operate from, for example, 4.8 to 36V. In dependence upon a size of the batteries, where for example, a voltage boosting circuit is provided as part of the control circuit for increasing a voltage that is provided from the device connector. The device connector is also envisaged as being a wireless device connector where power is wirelessly received from the first external electronic device and provided to the second external electronic device.

Optionally, the band is provided with a connector for coupling to devices such as drills and electric screwdrivers and such that are used in construction. Further optionally, the band is waterproof and the device connector is also waterproof for facilitating use underwater.

Referring to the embodiments shown in FIGS. 1a, 1b and 1d, the aesthetic device is for being worn around a mid section of an individual, such as in the form of a belt comprising a belt buckle formed at the second end 100b and apertures 101 formed at the first end for engaging the belt buckle. Of course, wearing the band around a wrist of an individual is also envisaged. This is especially applicable to the embodiment shown in FIG. 1d, where the batteries provide power to the LEDs and the LEDs then display a unique pattern as is determined by the control circuit. Referring to the embodiment shown in FIG. 2a, this aesthetic device is preferably worn around a wrist of the individual.

Preferably the LEDs are also covered with the waterproofing membrane in order to facilitate washing of the aesthetic device in accordance with the aforementioned embodiments to allow for use of this item underwater, such as for scuba diving. Advantageously, such an aesthetic device is useable underwater for various sports, such as scuba diving, where the batteries therein are charged through the device connector, preferably in the form of a USB connector, and once ready to use, the first and second ends of the elongated band are engaged in order for the aesthetic device to form an approximately continuous loop. This loop is then attached around a person's wrist or ankle or secured to a part of the scuba diving equipment in order to provide underwater illumination. Optionally, in the case of underwater use of the aesthetic device, the device connector is utilized for powering of items, such as lights or other electronic equipment.

Advantageously, the aesthetic device allows for carrying of additional battery power in a position on the body where it is convenient. In many cases various items are worn by people that are attached to the belt. As such, if the aesthetic device comprises large batteries, then this additional bulk around a mid section of a wearer will not adversely affect their performance. This therefore advantageously allows for having a power source disposed about the mid section and for use in powering of apparel, such as LEDs or liquid crystal or organic LED display screens disposed on portions of clothing.

Numerous other embodiments are envisaged without departing from the spirit or scope of the invention.

What is claimed is:
1. An aesthetic device comprising:
an elongated band comprising a first end and a second end at opposites ends thereof and an outer surface and an inner surface disposed therebetween;

an engagement mechanism disposed proximate the second end of the elongated band for engaging of the elongated band proximate the first end thereof;

a plurality of rechargeable battery cells embedded within the elongated band for at least one of providing of electrical energy therefrom and for storing of electrical energy therein;

a control circuit coupled with the plurality of rechargeable battery cells;

a device connector coupled with the control circuit and the plurality of rechargeable battery cells for at least one of providing of electrical energy thereto and for receiving of electrical energy therefrom;

wherein the control circuit comprises at lease one of a recharging circuit and a voltage regulator circuit coupled with the device connector and the plurality of rechargeable battery cells.

2. An aesthetic device according to claim 1 wherein the plurality rechargeable battery cells comprise a first rechargeable battery cell and a second rechargeable battery cell and wherein the elongated band comprises a gap formed between the first and second rechargeable battery cells where the gap allows for bending of the elongated band at a position along its length between the first and second rechargeable battery cells for bringing the first and second ends of the elongated band closer together.

3. An aesthetic device according to claim 2 wherein the first and second rechargeable battery cells comprises lithium type material.

4. An aesthetic device according to claim 1 wherein the device connector comprises a USB connector.

5. An aesthetic device according to claim 1 comprising a plurality of light emitting diodes disposed about the outer surface of the elongated band and coupled with the control circuit.

6. An aesthetic device according to claim 1 wherein the control circuit comprises at least one of a non volatile memory circuit and a non volatile memory receptacle for receiving a removable non volatile memory circuit for use in storing of digital data.

7. An aesthetic device according to claim 5 wherein the device connector is for providing of a voltage between 4.8V and 36V.

8. An aesthetic device according to claim 1 wherein the plurality of rechargeable battery cells are embedded within the elongated band in a waterproof manner.

9. An aesthetic device according to claim 2 comprising a plurality of light emitting diodes disposed about the outer surface of the elongated band and coupled with the control circuit.

10. An aesthetic device according to claim 9 wherein at least a light emitting diode from the plurality of light emitting diodes is disposed about the outer surface of the elongated band and proximate the gap formed between the first and second rechargeable battery cells.

11. An aesthetic device according to claim 1 wherein the engagement mechanism is formed about the device connector and the engagement between the first end and the second end of the elongated band provides an approximate waterproof seal for the device connector.

12. An aesthetic device according to claim 1 comprising a solar panel coupled with the control circuit for providing of electrical energy thereto.

13. A method comprising:

providing a plurality of rechargeable battery cells embedded within a flexible elongated band comprising a first end disposed opposite a second end;

providing a control circuit coupled with the plurality of rechargeable battery cells;

providing a device connector coupled with the control circuit for accepting a connection from one of a first external electronic device and a second external electronic device; in a first mode of operation, coupling of the first external electronic device to the device connector and charging the plurality of rechargeable battery cells the with electrical energy received from the first external electronic device; and, in a second mode of operation, coupling of the second external electronic device to the device connector and providing of electrical energy stored within the plurality of rechargeable battery cells to the second external electronic device, wherein the control circuit determines whether to receive electrical energy from the first external electronic device and whether to provide electrical energy to the second external electronic device.

14. A method according to claim 13 comprising providing a gap between two adjacent rechargeable battery cells and, in use, bending of the flexible elongated band proximate the gap for bringing the first end closer to the second end.

15. A method according to claim 14 comprising providing a plurality of light emitting diodes coupled with the control circuit and individually controlling an intensity and color of each of the plurality of light emitting diodes.

16. An aesthetic device comprising:

an elongated band comprising a first end and a second end at opposites ends thereof and an outer surface and an inner surface disposed therebetween;

an engagement mechanism disposed proximate the second end of the elongated band for engaging of the elongated band proximate the first end;

a first rechargeable battery cell embedded within the elongated band;

a second rechargeable battery cell embedded within the elongated band;

a gap formed between the first rechargeable battery cell and the second rechargeable battery cell and disposed between the inner surface and the outer surface;

a control circuit coupled with the first rechargeable battery cell and the second rechargeable battery cell;

a device connector for coupling with one of a first external electronic device and a second external electronic device, where in a first mode of operation the first external electronic device is for providing of electrical energy to the control circuit for charging of the first and second rechargeable battery cells and in a second mode of operation the second external electronic device is for receiving of electrical energy from the control circuit coupled with the first and second rechargeable battery cells and for providing the electrical energy to the second external electronic device, wherein the gap formed between the between the first rechargeable battery cell and the second rechargeable battery cell facilitates bending of the elongated band for the engagement mechanism to facilitate engaging the elongated band proximate the first end.

17. An aesthetic device according to claim 16 comprising a plurality of light emitting diodes disposed about the outer surface of the elongated band and coupled with the control circuit.

18. An aesthetic device according to claim 17 wherein at least a light emitting diode from the plurality of light emitting diodes is disposed about the outer surface of the elongated band and proximate the gap formed between the first and second rechargeable battery cells.

19. An aesthetic device according to claim 16 wherein the device connector comprises a wireless device connector where in the first mode of operation the first external electronic device is for wirelessly providing of electrical energy to the control circuit and in the second mode of operation the second external electronic device is for wirelessly receiving of electrical energy from the control circuit.

20. An aesthetic device according to claim 16 where, in use, the aesthetic device is for being worn around a mid section of an individual and is in the form of a belt wherein the engagement mechanism comprises a belt buckle.

\* \* \* \* \*